Jan. 14, 1958

J. C. PETREA 2,819,807

COUNTING AND STACKING DEVICE

Filed Aug. 8, 1955

INVENTOR
JAMES C. PETREA

BY *Bacon & Thomas*

ATTORNEYS

Jan. 14, 1958   J. C. PETREA   2,819,807
COUNTING AND STACKING DEVICE
Filed Aug. 8, 1955   3 Sheets-Sheet 3

INVENTOR
JAMES C. PETREA
BY Bacon & Thomas
ATTORNEYS

United States Patent Office 2,819,807
Patented Jan. 14, 1958

2,819,807

COUNTING AND STACKING DEVICE

James C. Petrea, Durham, N. C., assignor, by mesne assignments, to Sperry Rand Corporation, a corporation of Delaware Application August 8, 1955, Serial No. 526,831

7 Claims. (Cl. 214—6)

This invention relates to a counting and stacking device designed to receive single articles and to form a stack thereof, and also to count and remove from the stack successive groups of articles, each group containing a predetermined number of articles, and to deliver the counted groups for further processing, such as packaging or the like.

The device of this invention is disclosed particularly in connection with the stacking and counting of cookies or crackers but obviously the apparatus may be used to stack and count any similar articles such as cakes, sandwiches, bars, boxes, discs and other similar uniformly shaped items. All references herein to "cookies" or "articles" is intended to include any items subject to handling by this apparatus.

In general, the invention comprises a machine wherein a conveyor conducts a row of individual spaced articles to a generally star-shaped stacking wheel. The articles are sequentially delivered in position to be engaged by arms of the wheel and lifted thereby into position at the bottom of a stack extending upwardly therefrom. The wheel is so shaped and the stacked articles are so confined that the columnar stack formed is held in elevated position by the wheel as successive articles are added thereto.

The invention also includes novel guiding and restraining means for confining and guiding the columnar stack as it is formed, some of said guiding means constituting a movable gate operable in timed relation to a transfer mechanism which cyclically sweeps a predetermined number of stacked articles from the stack and pushes those articles along a guideway or chute to a take-away conveyor. The apparatus further includes means resting upon the top of the stack of articles to prevent undue "jiggling," which means is gravity-actuated into contact with the top of the stack to be freely movable vertically as the height of the stack increases or decreases.

It is therefore an object of this invention to provide an apparatus for transferring articles from one stage of processing to a subsequent stage of processing and in which such articles are arranged in stacks of predetermined numbers during the transfer.

It is another object of this invention to provide a stacking and counting device adapted to receive one article at a time and to form and deliver stacks of said articles containing a predetermined number thereof.

It is still another object of this invention to provide a counting and stacking device that will rapidly stack and count fragile articles with minimum likelihood of breaking any of them.

It is an additional object of this invention to provide a counting and stacking device of novel form and operation and one economical to produce, simple in construction and reliable in operation.

Other objects and advantages will become apparent to those skilled in the art as the description proceeds in connection with the accompanying drawings, wherein.

The machine of the present invention may be in the nature of an attachment to other article processing machinery but may be constructed as a separate machine if desired.

Figure 1:
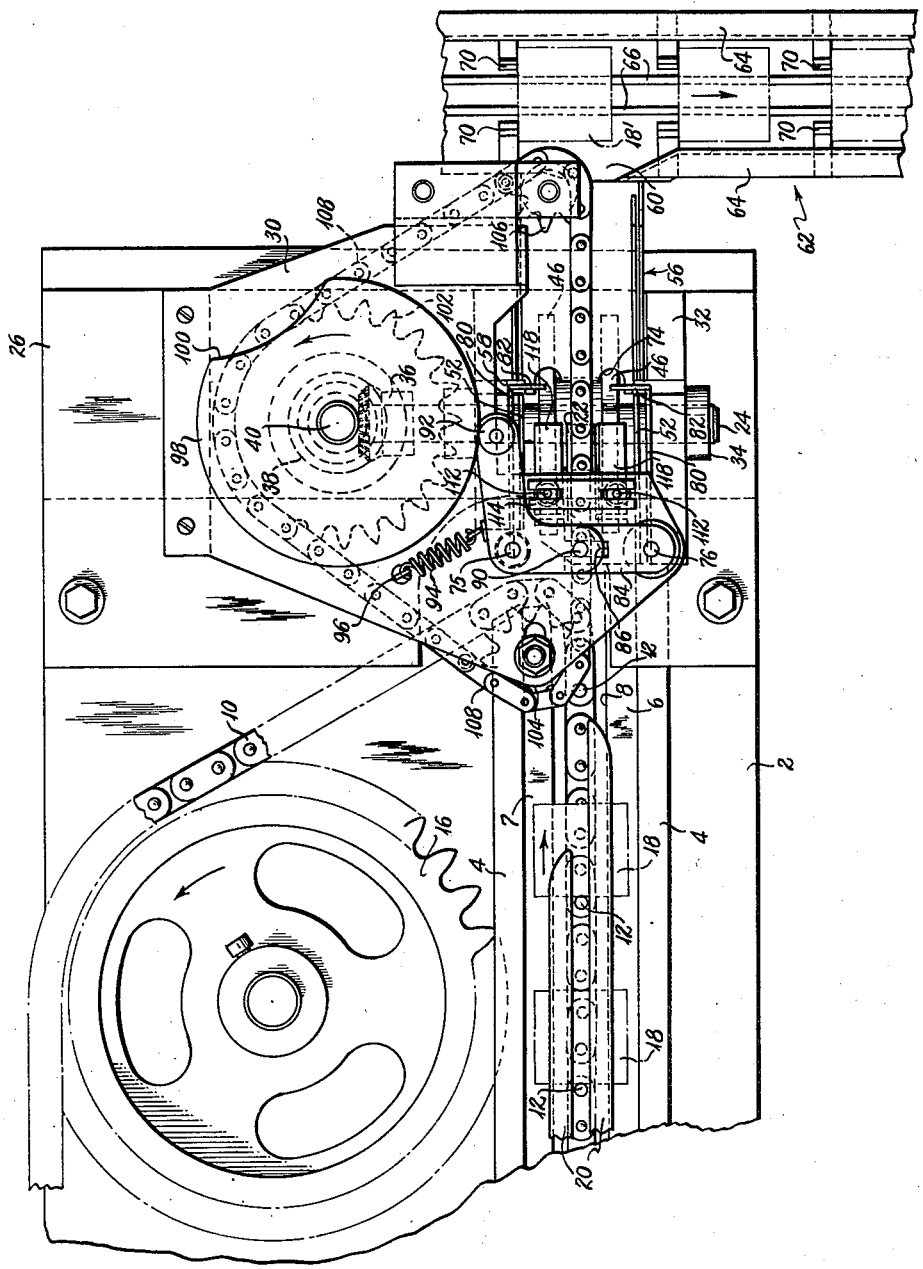
Fig. 1 is a top plan view of a portion of an article handling machine illustrating the subject matter of the present invention.

In Fig. 1, numeral 2 indicates the top of a machine frame, which may be a portion of a processing machine for articles such as a machine for forming sandwiches of cookies, crackers or the like, and the left-hand portion of the machine shown in Fig. 1 may constitute the delivery conveyor for delivering the processed articles from the processing machine. As stated above, however, the frame portion 2 may be formed separately from the processing machine and constitute a part of an independent apparatus according to the present invention.

The frame 2 supports guide means in the form of guide bars 4 (see also Fig. 3) having portions extending upwardly from the edges of supporting plates 6 and 7. The supporting plates 6 and 7 are spaced apart to define a longitudinal slot 8 therebetween. A roller or sprocket chain 10 is guided for longitudinal movement below the slot 8 and is provided with spaced upstanding pins 12 extending upwardly through the slot 8. The chain 10 is trained over an idling guide roller 14 (Figs. 2 and 3) and thence over a driven sprocket wheel 16. From the sprocket wheel 16 the chain extends to the left of Fig. 1 around suitable guide wheels (not shown) and returns along a path under the slot 8 as previously described. The dotted outlines 18 of the drawings indicate the articles previously processed and conveyed by the conveyor pins 12 along the guides 4, 6 and 7. The pins 12 insure uniform spacing of the articles 18, which are shown as sandwich cookies. The conveyor may also be provided with suitable hold-down shoes 20 arranged to rest on the upper surfaces of the articles to maintain alignment thereof and to hold the articles, by friction, against the leading edges of conveyor pins 12 to insure delivery to the stacking device in properly spaced relation. The hold-down shoes 20 may be supported in any convenient or known manner, such as by being pivoted intermediate their lengths to an end of a lever (not shown) which is, in turn, pivoted to a fixed part of the machine. Thus, the shoes may freely rise and fall with changing thicknesses of the articles 18 and yet function in the manner described. Preferably, the hold-down shoes 20 comprise a pair of parallel bars laterally spaced sufficiently far so that the conveyor pins 12 may project upwardly therebetween. As will be obvious from an inspection of Fig. 1, the conveyor pins 12 push successive articles 18 to the right to a point where the chain 10 turns around the idler or guide roll 14 at which time the pins 12 move laterally from behind the articles and around the end of supporting plate 7 and its associated rail 4. At that point the articles are pushed from the end of the conveyor onto a support 22 (Fig. 2) mounted on bracket 23 and which constitutes a support for the articles 18 at the stacking station. The support 22 is in the form of a finger (see Fig. 4) extending over the axis of shaft 24, to be described later.

Fixed to the upper surface of the frame top plate 2 is a sub-frame plate 26 upon which an upstanding plate 28 (Fig. 3) is secured in any suitable manner. An upper frame plate 30 is rigidly secured at one edge to the upper edge of the frame plate 28 and overhangs the plate 26 in vertically spaced relation thereto. Also fixed to the base plate 26 is a pair of blocks 32. The blocks 32 are laterally spaced with the space between them being in alignment with the guide bars 4 constituting the sides of the conveyor previously described. The shaft 24, heretofore referred to, is journalled in the blocks 32 with its axis slightly below the supporting finger 22 and positioned approximately below the outermost end of the finger 22 as clearly indicated in Fig. 2. The shaft 24 is provided with a pair of collars 34 (Fig. 3) bearing against the outer faces of the blocks 32 and serving to hold the shaft against axial displacement. As seen in Fig. 3, the shaft 24 extends to the left of the blocks 32 and is provided at its outer end with a miter gear 36. The miter gear 36 meshes with a miter gear 38 on vertical shaft 40 which is journalled in plates 26 and 30. The vertical shaft 40 has retaining collars 41 fixed thereon and a sprocket wheel 42 mounted thereon below plates 2 and 26. A drive chain 44 is trained around sprocket wheel 42 and a driving sprocket wheel (not shown) on the shaft on which the sprocket wheel 16 is mounted. However, chain 44 may be driven in any other suitable manner so long as it is driven in properly timed relation to the sprocket wheel 16.

Figure 2:
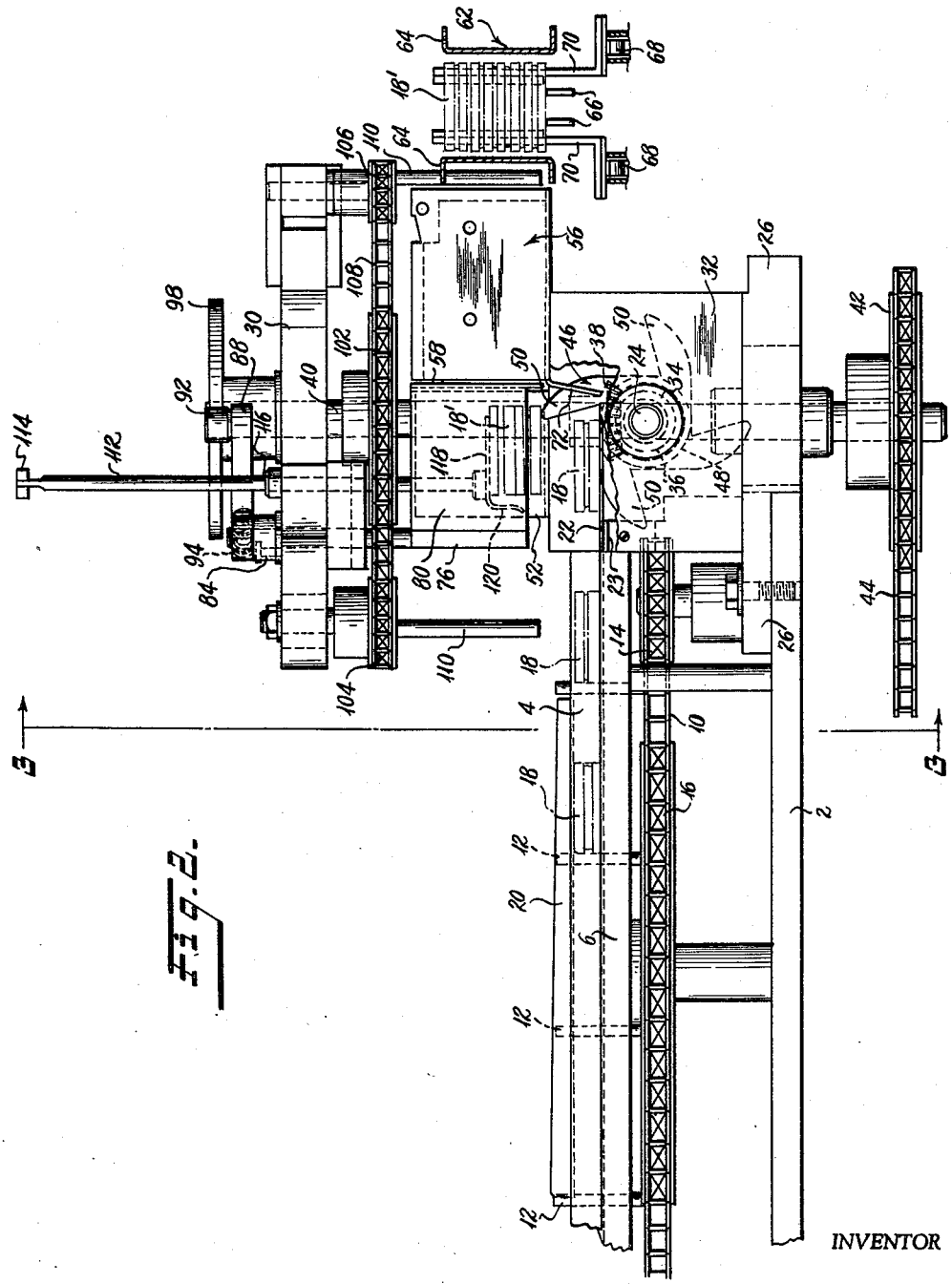
Fig. 2 is a side elevational view of the apparatus of Fig. 1, as viewed from the bottom of Fig. 1 but with parts thereof broken away to facilitate illustration.
Figure 3:
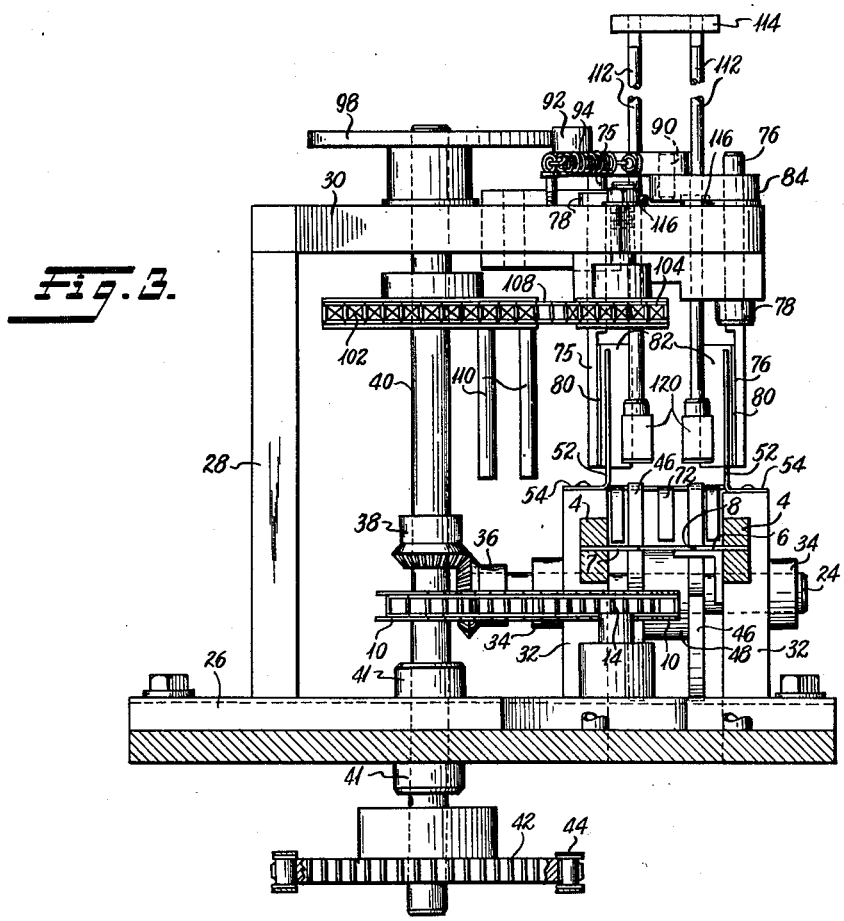
Fig. 3 is a vertical sectional view taken substantially along the line 3—3 of Fig. 2.

Between the blocks 32 the shaft 24 has fixed thereon a pair of similar axially spaced members defining a stacking wheel 46 (see Fig. 2). The members of the stacking wheel are each provided with a hub portion 48 and a plurality of of outwardly extending arms 50. The corresponding arms 50 on the members are in axial alignment and provided with leading edges starting generally tangent to the hub portions 48 but being curved outwardly and rearwardly therefrom at their outer ends. As viewed in Fig. 2, the stacking wheel 46 turns in a clockwise direction during operation. Thus, the edges of the arms 50 just described constitute the leading edges thereof. The stacking wheel 46 is so proportioned and the members are so axially spaced that the arms 50 pass upwardly on opposite sides of the supporting finger 22 onto which conveyor pins 12 deliver the articles 18. The articles 18 are of a width greater than the width of the supporting member 22 and thus the leading edges of successive arms 50 engage successive articles 18 to lift the same laterally upwardly from the path of the described conveyor. As is obvious, the conveyor pins 12 deliver successive articles 18 into what might be termed "pockets" between the arms 50 of the stacking wheel 46.

A pair of similar guide walls 52 (see Fig. 3) are secured to the upper edges of the blocks 32 by means of flanges 54 and extend upwardly therefrom forming substantially a continuation of the inner faces of the blocks 32. The guide walls 52 thus constitute guiding or restraining means on opposite sides of the articles 18' lifted by wheel 46 from the supporting finger 22 and they prevent lateral movement of articles from the stacked position.

Referring now to Fig. 2, the upper surfaces of the blocks 32 are also provided with means defining side walls and a bottom for a delivery chute 56. The side walls of the delivery chute are substantially in alignment with the guide walls 52 but are spaced slightly from the adjacent edges thereof to define slots 58, to be referred to later. The guide chute 56 projects rearwardly from the blocks 32 and terminates in alignment with opening 60 (Fig. 1) in a side wall of a take-away conveyor, indicated generally by numeral 62. The take-away conveyor comprises side walls 64 of a height at least equal to the height of a stack of articles 18' (Fig. 2) and bottom rails 66 upon which the stacks of articles slide. A pair of conveyor chains 68 are provided with longitudinally spaced upstanding fingers 70 arranged to engage and push successive stacks of articles 18' delivered thereto from the chute 56.

At its forward end, bottom wall of the chute 56 extends downwardly and slightly forwardly to about the level of the supporting finger 22 and adjacent the axis of the shaft 24. That downwardly extending portion of the bottom wall of chute 56 constitutes a restraining means 72 which may be termed a restraining flange. The restraining flange 72 is slotted, as at 74 (Figs. 3 and 4) to provide openings through which the arms 50 of stacking wheel 46 may rotate. The portions of the flange 72 bounding the slots 74 are in the nature of fingers positioned across the path of the articles 18 moved by the conveyor pins 12. As the stacking wheel 46 of Fig. 2 rotates clockwise, the article 18 then on supporting finger 22 will be engaged and lifted by the arm 50 immediately therebelow. During such rotation, the article 18 will tend to slide or move to the right but will be arrested by the slotted flange 72 so that it can move only upwardly from that position under the influence of the curved ends of the arms 50. As seen in Fig. 2, the articles 18' previously lifted by the stacking wheel 46 are held in elevated position by the next preceding arm 50 to provide space below the stack for an incoming article 18 and the succeeding arm 50 then raises the article from supporting finger 22 upwardly into engagement with the bottom of the stack 18' at about the time the preceding arm 50 rotates far enough to remove its support from the stack of articles. The upper plate 30, previously referred to, rotatably supports a pair of rock shafts 75 and 76 (Fig. 3) which extend vertically downwardly therethrough adjacent the nearest end edges of the vertical guide walls 52, as seen in Fig. 3. The axes of the shafts 75 and 76 are slightly outwardly of the planes of the guide walls 52. Each of the shafts 75 and 76 is provided with suitable collars 78 bearing against the upper and lower surfaces of the plate 30 to prevent axial movement of those shafts in their bearings. The portions of the shafts 75 and 76 outwardly of the guide walls 52 are cut away to substantially semicylindrical shape and the diametrical surfaces thereof are employed as mounting surfaces for gate supporting plates 80. Each of the gate supporting plates 80 is secured to its respective shaft in any suitable manner and normally extends along the outside of its adjacent wall 52 in a direction toward the delivery chute 56 previously described. At their rearmost edges and at positions directly outwardly of the slots 58, previously described, the plates 80 are bent inwardly to extend through the slots 58 in the form of flanges 82. The flanges 82 extend inwardly a substantial distance from the inner surfaces of the guide walls 52 and constitute a gate, which in its described closed position further restrains and guides the stack of articles 18' and prevents inadvertent movement thereof outwardly of the stack toward the chute 56. A crank or arm 84 (Figs. 1 and 4) is fixed to the upper end of shaft 76 above plate 30 to normally extend toward the shaft 75. The arm 84 is provided with a longitudinal slot 86 at its outer end. A bell crank 88 is fixed to the upper end of the shaft 75 with its short arm extending toward the shaft 76 and carrying a pin 90 engaging in the slot 86 of the arm 84. The other arm of the bell crank 88 is provided with a roller 92 journalled thereon and constituting a cam follower. A spring 94 (Figs. 1 and 4) is fixed at one end to the long arm of the bell crank 88 and is anchored at its other end in a suitable eyelet 96 carried by the top plate 30. Thus, the spring 94 normally urges the bell crank 88 to rotate its shaft 75 in a counterclockwise direction as viewed from the top and the pin 90 engaging in slot 86 simultaneously urges shaft 76 to rotate in a clockwise direction. Therefore, the spring 94 normally urges the gate flanges 82 to move outwardly of their slots 58 to thus open the "gate."

Figure 4:
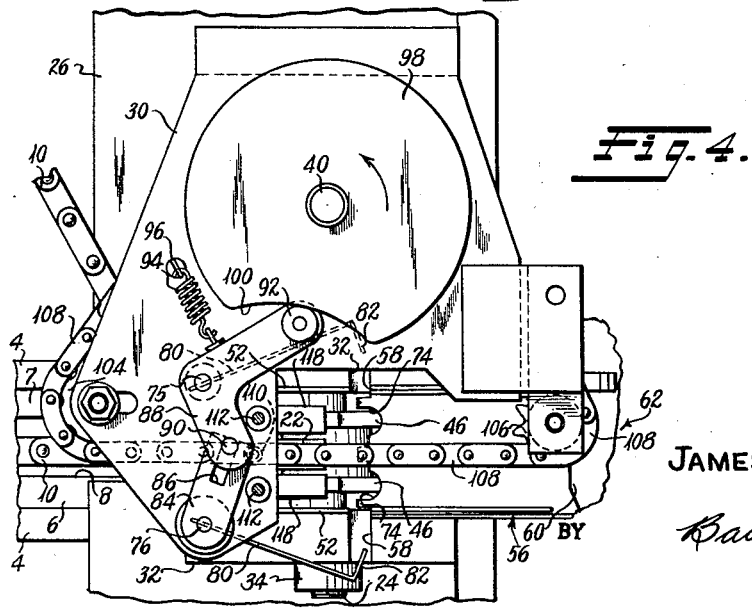
Fig. 4 is a plan view of a portion of the device shown in Fig. 1 but illustrating the parts in different relative positions.

The cam follower roller 92 is also held by spring 94 against the periphery of a disc cam 98 fixed to the upper end of vertical shaft 40. The cam disc 98 is circular throughout the major portion of its periphery but is provided with a depression 100 as indicated. When the roller 92 enters the depression 100, the shafts 75 and 76 may rotate in the manner described sufficiently far to completely withdraw the flanges 82 from the slots 58, as shown in Fig. 4. When the roller 92 is in engagement with the circular portion of the cam periphery, the shafts 75 and 76 are forced to rotate in the opposite direction to position the flanges 82 in the slots 58, in the position shown in Fig. 1, and thus hold the gate closed.

Also fixedly mounted on the vertical shaft 40, a short distance below the upper plate 30, is a sprocket wheel 102. The upper plate 30 rotatably supports a pair of idler sprockets 104 (see Figs. 1 and 4) and 106. A sprocket chain 108 is trained over the sprocket wheel 102 and idler sprockets 104 and 106 and is provided with spaced downwardly projecting transfer pins 110 (Figs. 2 and 3). The idler sprockets 104 and 106 are so positioned that the "run" of the chain 108 therebetween extends substantially along a median line between the guide walls 52 and chute 56 previously described. The idler sprocket 106 is positioned substantially at the outer end of the chute 56 closely adjacent the take-away conveyor 60.

A pair of vertical slide rods 112 are slidably guided through suitable openings in the upper plate 30 for free vertical movement therethrough. A suitable slotted weight or bridge piece 114 is secured to the upper ends of both slide rods 112 to insure their vertical movement in unison and rods 112 are further provided with collars 116 engageable with the upper surface of the plate 30 to limit their downward movement. Thus, the slide rods may fall under the influence of gravity to a lower position determined by the stop collars 116, and the bridge piece 113 causes them to rise or fall as a unit. At its lower end each slide rod 112 is provided with a horizontal shoe 118 arranged to rest on the top of the stack of articles 18', the shoes 118 being on opposite sides of the path of movement of transfer fingers 110. Each shoe 118 is further provided with a downwardly extending finger or flange 120 adapted to confine the foremost edge or side of the stack of articles 18'.

In the operation of the machine the articles 18 are fed by conveyor pins 12 to the supporting finger 22, and the stacking wheel 46, operating in timed relation to the conveyor pins 12, lifts successive articles 18 upwardly into position at the bottom of the stack of articles 18' and simultaneously lifts the stack sufficiently to accommodate the added article. Since the stacking wheel 46 is provided with circumferential spaced arms 50, there would be a tendency to cause the stack 18' to vibrate vertically. Such vibration could destroy fragile articles in the stack at relatively high operating speeds or might cause some of the articles to assume positions of misalignment.

The shoes 118 under the influence of the weight 114 prevent undue vibration or jiggling of the stack of articles 18' while fingers 120, guide walls 52, and gate flanges 82 function as restraining means to confine the articles 18' in a columnar stack over the stacking wheel 46.

In the particular embodiment shown, the miter gears 36 and 38 are of the same effective diameter and so the stacking wheel 46 makes one complete revolution during the interval of time vertical shaft 40 makes one complete revolution. The transfer pins 110 are so spaced along chain 108 that one pin moves through the position of the stack of articles 18' during each revolution of vertical shaft 40 and the depression 100 in cam 98 is so positioned that the roller 92 swings into the depression 100 at about the time a transfer pin 110 engages the forward edge of the stack of articles 18'. Thus the gate flanges 82 are "opened" just as a transfer pin 110 starts to move the stack of articles 18' to the right as seen in Figs. 1, 2 and 4. After the transfer pin has moved through the stack position and the articles moved thereby are in delivery chute 56, the cam 98 will have rotated sufficiently far to again close the "gate" and a succeeding stack of articles 18' is started. The stacking wheel 46 shown in the drawings comprises four arms 50. Therefore, during one complete revolution the wheel will build a stack of four articles 18'. The transfer pins 110 are of such vertical length that they engage and sweep four articles 18' from the stack into the delivery chute 56 and thence to take-away conveyor 60. Obviously, however, the parts may be designed and proportioned to build and transfer stacks of any desired number of articles.

Obviously the parts are so dimensioned, proportioned and positioned that the conveyor pins 12, stacking wheel 46, transfer pins 110, gate flanges 82 and fingers 70 of take-away conveyor 68 operate in timed relation so that each commences its cyclic function on an article or a stack at the proper time.

While a single specific embodiment of the invention has been shown and described herein, it is to be understood that the same is merely illustrative and not limiting. The invention defined by the appended claims may embrace other modifications.

I claim:

1. In a device for counting and stacking articles; stacking means for receiving successive single articles and moving said articles upwardly along a fixed path to form a columnar stack of articles and lifting said stack as successive articles are added to the bottom thereof, opposed guide walls on opposite sides of said stack, movable gate means on a third side of said stack between adjacent edges of said guide walls, spaced confining means on the fourth side of said stack, transfer means cyclically movable between said confining means and guide walls to move a plurality of articles laterally from said stack past said gate means, means for moving said transfer means, and means for opening and closing said gate means in timed relation to passage of said transfer means between said guide walls.

2. In a device for counting and stacking articles; stacking means for receiving successive single articles and moving said articles upwardly along a fixed path to form a columnar stack of articles and lifting said stack as successive articles are added to the bottom thereof, opposed guide walls on opposite sides of said stack, movable gate means on a third side of said stack between adjacent edges of said guide walls, spaced confining means on the fourth side of said stack, transfer means cyclically movable between said confining means and guide walls to move a plurality of articles laterally from said stack past said gate means, and means for moving said transfer means and for opening and closing said gate means in timed relation thereto, said transfer means comprising an endless chain extending over said stack and guided for movement along a path extending between said opposed guide walls, at least one depending finger carried by said chain and of such length as to sweep a predetermined number of articles from said stack.

3. A device as defined in claim 2, including a rotary shaft for driving said chain, a cam on said shaft, and a cam follower operatively connected to said gate means.

4. In a device for counting and stacking articles; stacking means for receiving successive single articles and moving said articles upwardly along a fixed path to form a columnar stack of articles and lifting said stack as successive articles are added to the bottom thereof, opposed guide walls on opposite sides of said stack, movable gate means on a third side of said stack between adjacent edges of said guide walls, spaced confining means on the fourth side of said stack, transfer means cyclically movable between said confining means and guide walls to move a plurality of articles laterally from said stack past said gate means, and means for moving said transfer means and for opening and closing said gate means in timed relation thereto, said gate means comprising a vertical rock shaft outwardly of each of said guide walls, a gate support fixed to each rock shaft and normally lying adjacent the outer face of its corresponding guide wall, a gate member on each gate support extending inwardly past the edge of its corresponding side wall toward the adjacent edge of the opposed guide wall, and actuating means for simultaneously rocking said rock shafts in opposite directions to open and close the gate defined by said gate members.

5. A device as defined in claim 4, wherein said actuating means comprises an arm fixed on each rock shaft and extending toward the other rock shaft, and a pin-and-slot connection between said arms.

6. In a device for counting and stacking articles; stacking means for receiving successive single articles and moving said articles upwardly along a fixed path to form a columnar stack of articles and lifting said stack as successive articles are added to the bottom thereof, opposed guide walls on opposite sides of said stack, movable gate means on a third side of said stack between adjacent edges of said guide walls, spaced confining means on the fourth side of said stack, transfer means cyclically movable between said confining means and guide walls to move a plurality of articles laterally from said stack past said gate means, and means for moving said transfer means and for opening and closing said gate means in timed relation thereto, said confining means each comprising a member adapted to rest on the top article of said stack and having a finger extending downwardly along said fourth side of said stack, and means joining and guiding said members for free vertical movement in unison.

7. In a device for counting and stacking articles; stacking means for receiving successive single articles and moving said articles upwardly along a fixed path to form a columnar stack of articles and lifting said stack as successive articles are added to the bottom thereof, opposed guide walls on opposite sides of said stack, movable gate means on a third side of said stack between adjacent edges of said guide walls, spaced confining means on the fourth side of said stack, transfer means cyclically movable between said confining means and guide walls to move a plurality of articles laterally from said stack past said gate means, and means for moving said transfer means and for opening and closing said gate means in timed relation thereto, a vertically movable gravity-actuated member adapted to rest on the top article of said stack, and means for limiting downward movement thereof to a level above said stacking means.

References Cited in the file of this patent

UNITED STATES PATENTS

| | | |
|---|---|---|
| 1,673,014 | Morrison | June 12, 1928 |
| 2,069,503 | Peyser | Feb. 2, 1937 |
| 2,324,930 | Joa | July 20, 1943 |
| 2,698,692 | Jones et al. | Jan. 4, 1955 |

FOREIGN PATENTS

| | | |
|---|---|---|
| 700,930 | Great Britain | Dec. 16, 1953 |